June 7, 1927.

J. TEMPERLEY 1,631,900

MEANS FOR PROPELLING WHEELED VEHICLES

Filed June 28, 1924

Inventor
J. Temperley
By Marks & Clerk
Attys.

Patented June 7, 1927.

1,631,900

UNITED STATES PATENT OFFICE.

JOSEPH TEMPERLEY, OF LONDON, ENGLAND.

MEANS FOR PROPELLING WHEELED VEHICLES.

Application filed June 28, 1924, Serial No. 723,034, and in Great Britain July 9, 1923.

This invention relates to wheeled vehicles and particularly to the propelling thereof.

The object of the invention is to provide means whereby a vehicle may be readily moved by manual power when desired.

The invention may be applied to all types of wheeled vehicles, but is particularly useful in connection with portable concrete mixers where it is desirable to move the apparatus short distances as the work progresses or for any other reason.

According to the invention one or more of the wheels of a vehicle is or are provided with abutments with which a bar or lever is adapted directly to co-operate to turn the wheel the abutments being formed upon a plate secured to the wheel.

In the accompanying drawings:—

Figure 3:
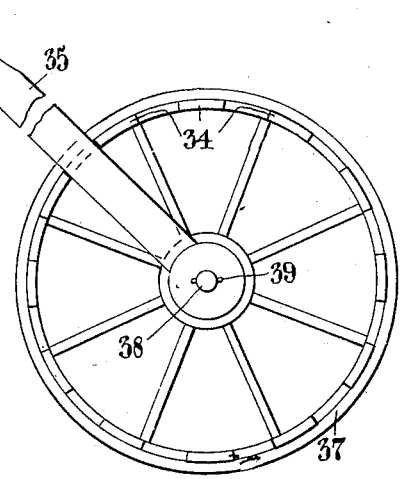
Figure 2:
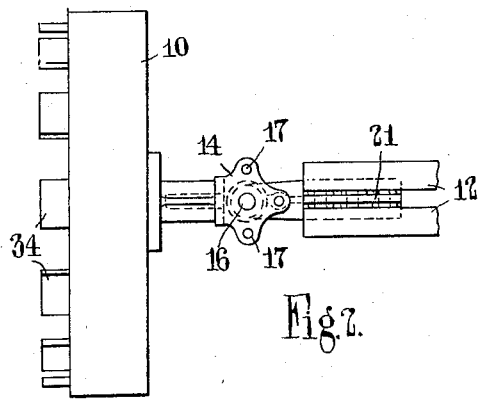
Figure 2 is a corresponding plan.

Figure 3 an end elevation of the wheel.

The invention is shown applied to a wheel for a concrete mixer in which the wheels are mounted in such a manner that the wheel axles may be turned through a right-angle when it is desired to move the vehicle at right-angles to the normal path.

Thus the wheels are journalled on stub axles 11 which are pivoted to dead axles 12 rigidly or otherwise connected to the framework 13 of the machine. The inner ends of the stub axles are provided with members having horizontal flanges 14, 15, between which the end of the dead axle is embraced. A pivot pin 16 passes through the flanges and the dead axle. The flanged member and the stub axle are rigidly fixed together in any suitable manner.

In the upper flange or in both flanges holes 17 are provided which are adapted to register, when the stub axle is in the appropriate positions, with a single hole 18 in the dead axle, and a locking pin 19 is provided which fits said holes and is adapted to lock the stub axle to the dead axle when the desired adjustment is effected. The holes 17 are so arranged that the wheels may be pivoted to a position at right-angles to the normal.

Figure 1:
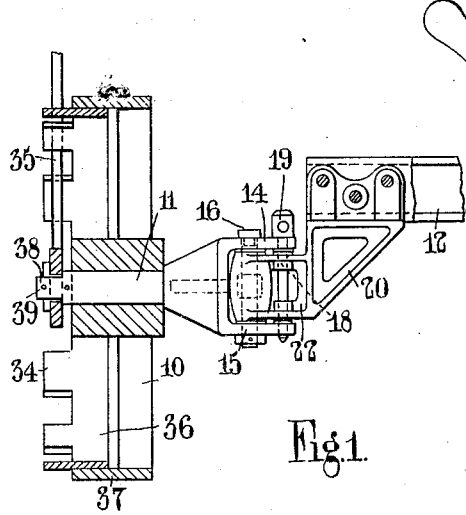
Figure 1 is an elevation partly in section of a wheel and connection between the stub axle and dead axle.

According to the preferred construction (see Figure 1) the end of the dead axle is formed as a bracket member 20 which has an upwardly extending part 21 adapted to lie between and be bolted or riveted to the channels forming the main portion of the axle. A horizontal part 22 of the bracket member constitutes the end of the dead axle and is disposed between the flanges 14, 15.

In order to facilitate the movement of the machine, for instance when it is necessary to propel the vehicle short distances either in the normal longitudinal direction or transversely thereto, certain or all of the wheels may be provided with lever devices whereby they may be rotated manually with the minimum of manual labour. Thus the wheels may be provided with projections or teeth 34 projecting outwardly from the outer face thereof. A lever or bar 35 mounted to pivot upon the outer end of the stub axle is adapted to be adjustably located in the spaces between the teeth whereby on exerting pressure upon the adjacent tooth the wheel may be turned, thus transporting the vehicle.

According to a convenient mode the teeth 34 may be cut out from a plate 36 which is bent to a circular shape and is fitted within the rim 37 of the wheel and is riveted thereto. The end of the stub axle 11 may be reduced in diameter at 38 to accommodate the lever or bar and the latter may be temporarily held thereon by a split pin or cotter 39 passing through a hole in the axle.

According to a modification the projections or teeth may be disposed entirely within the rim and the lever may have a cranked portion adapted to fit within the rim and engage diametrically opposite teeth whereby the desired turning effort may be imparted to the wheel.

Having now described my invention, what I claim as new and desire to secure by Letters Patent is:—

Means for propelling wheeled vehicles comprising a wheel having a rim, a plate mounted within the rim and fixed thereto, projections on said plate extending beyond the edge of the rim, and defining axially extending recesses in said plate and a pivotally mounted lever adapted directly to engage in the recesses to rotate the wheel in either direction.

In testimony whereof I have signed my name to this specification.

JOSEPH TEMPERLEY.